United States Patent
Dumesnil et al.

[11] Patent Number: 5,281,561
[45] Date of Patent: Jan. 25, 1994

[54] LOW TEMPERATURE SEALING GLASS COMPOSITION

[76] Inventors: Maurice E. Dumesnil, 27850 Via Feliz, Los Altos Hills, Calif. 94022; Leo Finkelstein, 1643 27th Ave., San Francisco, Calif. 94122

[21] Appl. No.: 15,460

[22] Filed: Feb. 9, 1993

[51] Int. Cl.$^5$ .......... C03C 8/14; C03C 8/24; C03C 3/23; C03C 3/072
[52] U.S. Cl. .................. 501/17; 501/15; 501/43; 501/75; 501/76
[58] Field of Search .............. 501/15, 17, 43, 75, 501/76

[56] References Cited

U.S. PATENT DOCUMENTS

| | | | |
|---|---|---|---|
| 3,951,669 | 4/1976 | Malmendier et al. | 501/4 |
| 4,186,023 | 1/1980 | Dumesnil et al. | 501/15 |
| 4,251,595 | 2/1981 | Dumesnil et al. | 428/426 |
| 4,310,357 | 1/1982 | Matsuura et al. | 501/15 |
| 4,365,021 | 12/1982 | Pirooz | 501/15 |
| 4,405,722 | 9/1983 | Kokubu et al. | 501/15 |
| 4,522,925 | 6/1985 | Pirooz | 501/15 |
| 4,537,863 | 8/1985 | Matsuura et al. | 501/15 |
| 4,704,370 | 11/1987 | Seki et al. | 501/15 |
| 4,710,479 | 4/1987 | Yamanaka et al. | 501/15 |
| 5,075,261 | 5/1990 | Yamanaka et al. | 501/15 |
| 5,116,786 | 5/1992 | Matsuura | 501/15 |

FOREIGN PATENT DOCUMENTS

| | | | |
|---|---|---|---|
| 1090104 | 11/1967 | United Kingdom | 501/17 |

*Primary Examiner*—Mark L. Bell
*Assistant Examiner*—David Sample
*Attorney, Agent, or Firm*—Morrison & Foerster

[57] ABSTRACT

A low temperature sealing glass composition suitable for sealing integrated circuit alumina packages at temperatures below 400° C. in a short time of about ten minutes. This sealing glass composition is a mixture of a glass powder and 1 to 50% (by weight) of one or more low expansion ceramic powders. The glass powder comprises a lead borate or lead zinc borate glass and the joint addition of $Cu_2O$, $Tl_2O$ and F in a range of 6.3 to 20% (by weight) wherein the molar ratio of Cu to Tl to F is in the range between 0.8 Cu: 0.8 Tl: 0.8 F to 1.2 Cu: 1.2 Tl: 1.2 F. The glass in powder form is blended with one or more compatible low expansion ceramic powders including cordierite, zircon, willemite, lead titanate or modified tin oxide.

16 Claims, No Drawings

LOW TEMPERATURE SEALING GLASS COMPOSITION

TECHNICAL FIELD

This invention relates to a low temperature sealing glass composition. More particularly it relates to a sealing glass composition combining a very low melting glass powder and one or more low expansion refractory filler powders.

This sealing glass composition is useful for bonding ceramic components in microelectronic circuitry in the temperature range of 3800°-4000° C. it is particularly useful as a hermetic seal in alumina packages for semiconductor integrated circuits.

BACKGROUND

Conventional lead borate solder glasses have been extremely successful in the production of hermetic seals in semiconductor ceramic packaging. These sealing glasses are particularly useful in package geometries where two ceramic slabs sandwich a metal lead frame imbedded in glass. This design is embodied in ceramic dual in-line packages (CerDips), ceramic quad in-line packages (CerQuads) and their variations. These conventional solder glasses, however, require a sealing cycle above 400° C., typically 430° C. or higher. These temperatures are now considered on the high side for the more recent very large-scale integrated (VLSI) silicon devices.

This invention addresses the problem of sealing semiconductor devices in hermetic ceramic packages with a low temperature sealing glass. Since the onset of integrated circuits fabricated on silicon single crystal wafers around 1964, very fast semiconductor devices have been designed by a process known as bipolar technology which relies on deep diffusion silicon structures. These devices being somewhat temperature and surface insensitive were readily alloyed, die attached and hermetically sealed in alumina ceramic packages in the temperature range of 450° to 500° C.

A rapidly growing competing design technology based not on pn junction high current injection but on surface capacitive channel switching is referred to as Complementary Metal Silicon Oxide Semiconductor (CMOS). emos requires much less power to operate. The speed of emos designs is increasing so quickly they will soon outstrip almost all competing semiconductor technologies with a concurrent impact in portable, work station and mainframe computers. This increased operational speed in CMOS is, however, critically dependent on submicron scale masking technology, which itself is very sensitive to package sealing temperatures.

Very large scale integrated semiconductor devices (VLSI) such as large 300 to 600 mil square CMOS and BiPolar CMOS (BICMOS) silicon chips are quite sensitive to the thermal processes required during their last fabrication steps. These steps include metal contact alloying, die attach and final seal. These are presently performed in the 430° C. range for several minutes.

The thermal sensitivity of CMOS semiconductor devices arises due to the presence of extremely dense, compact, ultrafine metallization lines reaching a fraction of a micron in width combined with ultrathin dielectric films reaching the 100 Angstrom thickness range. These three-dimensional surface interconnection patterns are prone to immediate or longer term failure modes such as metal diffusion, alloying and dielectric punch-through.

Industry consensus indicates that these fabrication steps should be made below 400° C. and preferably close to 380° C. to insure greater fabrication yields, throughput, and long term reliability.

It is an object of this invention to provide a sealing glass composition which can achieve a hermetic seal to alumina ceramics below 400° C. in a short time (10 minutes), preferably in the 380° C. range or lower and capable of withstanding extended thermal shocks. The glass seal satisfies the desired characteristics such as thermal stress resistance, insensitivity to plating acids, high electrical resistivity and low dielectric constant.

A prior patent, U.S. Pat. No. 4,186,023 issued to Dumesnil et al., discloses the use of both cuprous oxide and fluorine as joint additives to lead borate. The present application extends this approach by the addition of thallic oxide, cuprous oxide and fluorine as a ternary combination in a specific preferred molar ratio of about 1 Cu: 1 Tl: 1 F. This provides an unexpected and unusually large lowering in the softening point and viscosity in the resulting glass without affecting the glass stability against early recrystallization.

DISCLOSURE OF THE INVENTION

The sealing glass composition of the present invention is directed to very fluid, very low melting glasses produced in the lead borate and lead zinc borate glass forming systems by the joint addition of cuprous oxide, thallic oxide and fluorine. The combination of cuprous oxide, thallic oxide and fluorine is added to equal 6.3 to 20% (by weight) of the glass composition, preferably 10 to 16% (by weight), wherein the specific molar ratio of Cu to Tl to F is in the range between 0.8 Cu: 0.8 Tl: 0.8 F to 1.2 Cu: 1.2 Tl: 1.2 F, and preferably about 1 Cu: 1 Tl: 1 F. Thus, the softening point of this inventive glass and its increased fluidity is achieved by modifying the lead borate or lead zinc borate glass by the addition of these specific metal oxides and fluorine in a specific molar ratio.

The thermal expansion coefficient of this inventive glass composition is lowered by the addition of compatible low expansion ceramic fillers in powder form. The preferred filler powder is cordierite ($2MgO-2Al_2O_3-5-SiO_2$) Secondary fillers with intermediate thermal expansion coefficients may be added to minimize the formation of microcracks in the glass between filler particles during intensive thermal stresses of the glass seal.

Other additives in minor amounts, up to 5% (by weight), may be included to enhance certain desirable properties such as extended glass lifetime. These additives include $Bi_2O_3$, $TeO_2$, BaO, MgO, CaO, SrO, $SnO_2$, $Li_2O$, $Na_2O$ and $K_2O$.

The preferred composition comprising lead oxide, boron oxide, zinc oxide, cuprous oxide, thallic oxide and fluorine represents the most fluid glass forming eutectic in the above six component systems. We have found that the joint addition of cuprous oxide, thallic oxide, and fluorine in a controlled ratio substantially reduces the softening point and viscosity of the parent lead borate or lead zinc borate glasses.

The addition of small amounts of silica and alumina enhances the stability of the resulting glass in the presence of a filler to permit extended processing and temperature excursions during preglazing and lead frame insertion prior to final seal.

MODES FOR CARRYING OUT THE INVENTION

The low melting glass of this invention has a composition comprising (in weight per cent):

|     |                    |                 | General   | Preferred  |
| --- | ------------------ | --------------- | --------- | ---------- |
| (a) | PbO                | (lead oxide)    | 60 to 80  | 65 to 75   |
| (b) | $B_2O_3$           | (boron oxide)   | 5 to 12   | 6 to 10    |
| (c) | $Cu_2O$            | (cuprous oxide) | 1 to 5    | 1.5 to 3   |
| (d) | $Tl_2O$            | (thallic oxide) | 5 to 15   | 8 to 12    |
| (e) | F                  | (fluorine)      | 0.3 to 1.5| 0.5 to 1.2 |
| (f) | ZnO                | (zinc oxide)    | 0 to 10   | 5 to 9     |
| (g) | $SiO_2$            | (silica)        | 0 to 3    | 1 to 2     |
| (h) | $Al_2O_3$          | (alumina)       | 0 to 3    | 0.5 to 0.8 | wherein the combination of $Cu_2O$, $Tl_2O$, and F is between 6.3 to 20%; and the molar ratio of Cu to Tl to F is in the range between 0.8 Cu: 0.8 Tl: 0.8 F to 1.2 Cu: 1.2 Tl: 1.2 F.

The preferred glass compositions are characterized by a DTA softening point in the range of 260°–280° C. and linear thermal expansion coefficients of the order of 105 to $110 \times 10^{-7}$/°C. In addition, the preferred glass compositions have remarkable resistance to sulfuric acid baths used for tin plating and the ability of being admixed with large quantities of ceramic filler(s) in particulate form while retaining high fluidity at sealing temperatures.

In accordance with this invention a refractory particulate filler is admixed with the glass in amounts reaching 50 per cent by weight and preferably 10 to 38 per cent by weight, to tailor the thermal expansion of the resulting sealing glass to a value close to alumina (65 to $72 \times 10^{-7}$/°C.). The ceramic powders to be used have a thermal expansion coefficient of no higher than $30 \times 10^{-7}$/°C. within a temperature range of from room temperature to 300° C.

According to this invention the low temperature sealing glass composition comprises a mixture of glass powder and 1 to 50 weight percent of a compatible low expansion ceramic filler or a combination of two or more different low expansion fillers which include:

| Cordierite            | $(2MgO-2Al_2O_3-5SiO_2)$ |
| --------------------- | ------------------------ |
| Willemite             | $(Zn_2SiO_4)$            |
| Lead titanate         | $(PbTiO_3)$              |
| modified lead titanate| $(Pb_{0.75}Ca_{0.25}TiO_3)$ |
| modified tin oxide    | $(SnO_2-ZnO)$            |
| Zirconium silicate    | $(ZrSiO_4)$              |
| Beta spodumene        |                          |
| Beta eucryptite       |                          |

Cordierite is preferred due to its low thermal expansion ($10 \times 10^{-7}$/°C.), low dielectric constant and its excellent chemical durability. A secondary filler may be added to further improve thermal stress resistance. Preferred secondary fillers include modified tin oxide, lead titanate, zircon and willemite.

The following examples further illustrate the invention. These examples are not intended to limit the invention in any manner.

EXAMPLE 1

A base glass was prepared by mixing the following:
700 grams of red lead oxide ($Pb_3O_4$)
60 grams of lead fluoride
120 grams of thallic oxide
75 grams of zinc oxide
120 grams of boric acid
24 grams of cuprous oxide
24 grams of silica
6.5 grams of alumina The batch was transferred into a platinum crucible and melted at 800° C. for one hour in an electric furnace. The molten glass was then rapidly quenched by pouring it through counter rotating stainless steel rollers to produce glass flakes. The resulting glass flakes were ground in an alumina ball mill and screened through a 150 mesh stainless steel screen. The resulting glass has a composition (in weight per cent) as follows:

| PbO       | 69.3% |
| --------- | ----- |
| $B_2O_3$  | 6.8   |
| ZnO       | 7.2   |
| $Cu_2O$   | 2.2   |
| $Tl_2O$   | 11.0  |
| F         | 0.9   |
| $SiO_2$   | 2.0   |
| $Al_2O_3$ | 0.6   | wherein the molar ratio of Cu to Tl to F is about 1 Cu: 1 Tl: 1 F.

EXAMPLE 2

The base glass from Example 1 was mixed thoroughly by ball milling with 14 per cent by weight cordierite ceramic powder. The resulting powder was combined with butyl carbitol acetate solvent to form a printing paste. The paste was printed onto the respective sealing surfaces of alumina ceramic base and cap of CerDips. The alumina ceramic parts were heated to 380° C. at a rate of 5° C./minute to vaporize the vehicle in the paste and to fuse the glass powder onto the sealing surface of each ceramic part. Alloy 42 lead frames were properly positioned on the glass layer of the base and fused into the glass layer. The final step involved positioning the base and cap glass layers face to face on a sealing boat, then heating the filled boat to 380°–390° C. at a rate of 50° C./minute and held at peak temperature for 10 minutes to seal the CerDip alumina packages.

Thermal shock tests were performed according to MIL-STD-883 Method 1011, condition C (150° C. to −65° C.) for 100 cycles. The parts were measured for hermeticity damage by fine and gross leak tests. None of the 30 packages was damaged by the heat shock test.

Acid resistance of the low temperature sealing composition of the invention was tested by soaking the sealed CerDip packages in a 20% sulfuric acid solution maintained at 70° C. for 1 minute and in 10% HCl at room temperature with no noticeable visual attack nor weight loss.

EXAMPLE 3

The base glass from example 1 was mixed with 12 per cent by weight cordierite and 6 per cent modified tin oxide ($SnO_2 + 1\%$ ZnO) The resulting powder was processed as in Example 2 but on larger ceramic parts (one by one inch CerQuads). Thermal shock data indicated no failure.

EXAMPLE 4

The base glass from Example 1 was successively blended with 36 per cent by weight lead titanate, 30 per cent willemite, and 12 per cent spodumene. Very good sealing glasses were obtained.

EXAMPLES 5 To 14

Further glass formulations were prepared and are listed in Table 1.

TABLE 1

| (EXAMPLES IN WEIGHT PER CENT) | | | | | | | | | | |
|---|---|---|---|---|---|---|---|---|---|---|
| | 5 | 6 | 7 | 8 | 9 | 10 | 11 | 12 | 13 | 14 |
| PbO | 70 | 70 | 70 | 70 | 70 | 70 | 70 | 70 | 70 | 70 |
| $B_2O_3$ | 6 | 6 | 6 | 6 | 6 | 6 | 6 | 6 | 6 | 6 |
| ZnO | 7.5 | 7.5 | 7.5 | 7.5 | 7.5 | 7.5 | 7.5 | 7.5 | 7.5 | 7.5 |
| $Cu_2O$ | 2 | 2 | 2 | 2 | 2 | 2 | 2 | 2 | 2 | 2 |
| $Tl_2O$ | 9 | 9 | 9 | 9 | 9 | 9 | 9 | 9 | 9 | 9 |
| F | 0.9 | 0.9 | 0.9 | 0.9 | 0.9 | 0.9 | 0.9 | 0.9 | 0.9 | 0.9 |
| $SiO_2$ | 2 | 2 | 2 | 2 | 2 | 2 | 2 | 2 | 2 | 2 |
| $Al_2O_3$ | 0.6 | 0.6 | 0.6 | 0.6 | 0.6 | 0.6 | 0.6 | 0.6 | 0.6 | 0.6 |
| $Bi_2O_3$ | 2 | — | — | — | — | — | — | — | — | — |
| $TeO_2$ | — | 2 | — | — | — | — | — | — | — | — |
| BaO | — | — | 2 | — | — | — | — | 1 | 1 | 1 |
| $SnO_2$ | — | — | — | 2 | — | — | — | — | — | — |
| MgO | — | — | — | — | 2 | — | — | — | — | — |
| CaO | — | — | — | — | — | 2 | — | — | — | — |
| SrO | — | — | — | — | — | — | 2 | — | — | — |
| $Li_2O$ | — | — | — | — | — | — | — | 1 | — | — |
| $Na_2O$ | — | — | — | — | — | — | — | — | 1 | — |
| $K_2O$ | — | — | — | — | — | — | — | — | — | 1 |

Modifications of the above described invention that are obvious to those of skill in the fields of glass chemistry, semiconductor packaging, and related arts are intended to be within the scope of the following claims.

We claim:

1. A low melting point glass composition consisting essentially of a homogeneous mixture of (in weight percent)

| (a) | PbO | 60 to 80% |
|---|---|---|
| (b) | $B_2O_3$ | 5 to 12% |
| (c) | $Cu_2O$ | 1 to 5% |
| (d) | $Tl_2O$ | 5 to 15% |
| (e) | F | 0.3 to 1.5% |
| (f) | ZnO | 0 to 10% |
| (g) | $SiO_2$ | 0 to 3% |
| (h) | $Al_2O_3$ | 0 to 3% | and admixed with 1 to 50% (by weight) of a low expansion ceramic filler, wherein the combination of all $Cu_2O$, $Tl_2O$, and F equals 6.3 to 20%, and the molar ratio of Cu to Tl to F is in the range between 0.8 Cu: 0.8 Tl: 0.8 F to 1.2 Cu: 1.2 Tl: 1.2 F.

2. A low melting point glass composition consisting essentially of (in weight percent):

| (a) | PbO | 65 to 75% |
|---|---|---|
| (b) | $B_2O_3$ | 6 to 10% |
| (c) | $Cu_2O$ | 1.5 to 3% |
| (d) | $Tl_2O$ | 8 to 12% |
| (e) | F | 0.5 to 1.2% |
| (f) | ZnO | 5 to 9% |
| (g) | $SiO_2$ | 1 to 2% |

(h) $Al_2O_3$ 0.5 to 0.8% and admixed with 1 to 50% (by weight) of a low expansion ceramic filler, wherein the combination of all Cu2O, Tl2O, and F equals 10 to 16%; and the molar ratio of Cu to Tl to F is about 1 Cu: 1 Tl: 1 F.

3. The glass composition of claim 1 wherein the filler is comprised of two or more different low expansion ceramic fillers.

4. The glass composition of claim 2 wherein the filler is comprised of two or more different low expansion ceramic fillers.

5. The glass composition of claim 1 wherein the filler is cordierite.

6. The glass composition of claim 2 wherein the filler is cordierite.

7. The glass composition of claim 3 wherein the fillers are a combination of cordierite and a secondary low expansion ceramic filler.

8. The glass composition of claim 4 wherein the fillers are a combination of cordierite and a secondary low expansion ceramic filler.

9. The glass composition of claim 7 wherein the secondary filler is modified tin oxide, lead titanate, zircon, or willemite.

10. The glass composition of claim 8 wherein the secondary filler is modified tin oxide, lead titanate, zircon, or willemite.

11. The glass composition of claim 1 further consisting essentially of up to 5% (by weight) of at least one additive selected form the group consisting of $Bi_2O_3$, $TeO_2$, BaO, MgO, CaO, SrO, $SnO_2$, $Li_2O$, $Na_2O$ and $K_2O$.

12. The glass composition of claim 2 further consisting essentially of up to 5% (by weight) of at least one additive selected from the group consisting of $Bi_2O_3$, $TeO_2$, BaO, MgO, CaO, SrO, $SnO_2$, $Li_2O$, $Na_2O$ and $K_2O$.

13. The glass composition of claim 3 further consisting essentially of up to 5% (by weight) of at least one additive selected from the group consisting of $Bi_2O_3$, $TeO_2$, BaO, MgO, CaO, SrO, $SnO_2$, $Li_2O$, $Na_2O$ and $K_2O$.

14. The glass composition of claim 4 further consisting essentially of up to 5% (by weight) of at least one additive selected from the group consisting of $Bi_2O_3$, $TeO_2$, BaO, MgO, CaO, SrO, $SnO_2$, $Li_2O$, $Na_2O$ and $K_2O$.

15. The glass composition of claim 3 wherein the fillers are a combination of cordierite and modified tin oxide.

16. The glass composition of claim 4 wherein the fillers are a combination of cordierite and modified tin oxide.

* * * * *